J. Weis,
Pump Piston.

Nº 13,967.  Patented Dec. 18, 1855.

Witnesses.
Henry Howsen
Thomas Bennett

Inventor.
Joseph Weis.

UNITED STATES PATENT OFFICE.

JOSEPH WEIS, OF BORDENTOWN, NEW JERSEY.

SUCKER FOR PUMPS.

Specification of Letters Patent No. 13,967, dated December 18, 1855.

*To all whom it may concern:*

Be it known that I, JOSEPH WEIS, of Bordentown, county of Burlington, and State of New Jersey, have invented certain new and useful Improvements in Pumps; and I do hereby declare that the following is a full, clear, and exact description of the same, reference being had to the accompanying drawing and to the letters of reference marked thereon.

My invention consists in placing inside a hollow metal cone perforated with holes a similarly shaped piece of gum elastic or other similar substance, which is confined to the inside of the cone by a peculiarly shaped block in such a manner that when the whole is attached to the pump rod it shall form a bucket simple and free from friction, the perforations serving as passages for the water and the gum elastic the double purpose of valve and packing as hereinafter more fully described, and the same arrangement of hollow perforated cone, block and gum elastic being applicable to pump valves generally.

In order to enable others skilled in the art to make and use my invention I will now proceed to describe its construction and operation.

Figure 1:
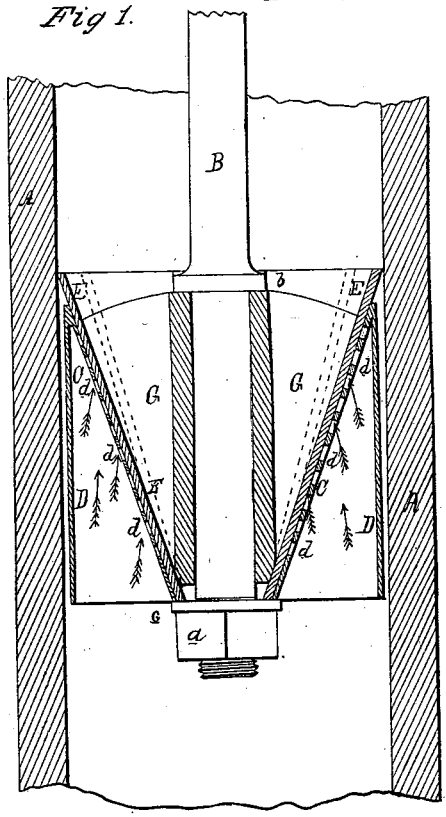
Figure 2:
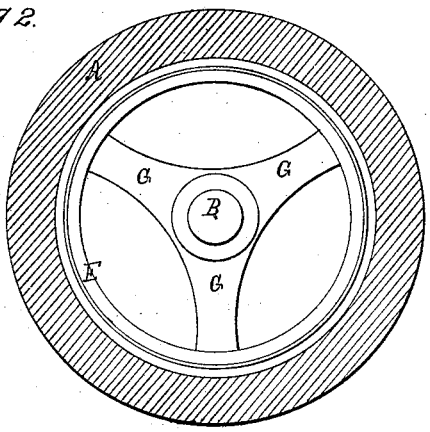

On reference to the drawing which forms a part of this specification, Figure 1 is a sectional elevation of part of an ordinary pump barrel, with my improvements as applied to the bucket contained therein. Fig. 2 is a sectional plan of the same.

The same letters of reference allude to similar parts in both views.

A is part of a pump barrel, B the rod which passes through the hub of the wedge formed piece G, the latter having three wings as shown in Fig. 2.

C is a hollow metal cone perforated by a series of holes $d$ and to the top of this cone is secured the hollow metal cylinder D, the diameter of which is somewhat less than the bore of the barrel. Inside the hollow cone I place a similarly shaped piece of gum elastic or other similar yielding substance E, the top of which extends a short distance beyond the cone so as to coincide with the bore of the pump barrel. The pump rod B has a collar at $b$ resting on the top of the wedge shaped piece G, and on the bottom of the rod is the nut $a$ and washer $c$ which binds against the small end of the cone C so that on the tightening of the nut the wings of the block G bind the gum elastic against the inside of the hollow cone at the three points seen in Fig. 2.

Operation: On the bucket (formed as above described) being raised in the barrel the pressure of the column of water above keeps the gum elastic tight over the orifices $d$ in the hollow cone C and prevents effectually any escape in that direction, while the same pressure also causes that portion of the gum elastic which projects above the hollow cone to bend outward and bear against the inside of the barrel thereby forming a secure water tight packing. On the descent of the piston or bucket the water below pressing through the orifices $d$ against the gum elastic forces the latter inward at the spaces intervening between the wings of the block G, causes it to assume the form shown in red lines (Fig. 1) and thereby allows a free passage for the water. The moment the upward stroke commences however the gum elastic resumes its former position. The cylindrical portion D of the bucket serves as a guide and retains the whole, during its reciprocating movement, central with the bore of the barrel. It will be thus seen without further description that the cone shaped gum elastic serves the purpose of both valve and packing causing but little friction on the ascent of the bucket and less on its descent, at the same time the simple construction of the whole contrivance enables adjustments and repairs to be easily accomplished. In applying the same contrivance to the section and other valves of pumps the only alteration required would be to pass a simple bolt through the hub of the block G instead of the pump rod, and to secure the hollow cone C to the barrel or its branches at the position required when the gum elastic would form a valve at once simple and effective.

I wish it to be understood that I do not lay claim exclusively to cone shaped elastic substances as self packing apparatus for pump buckets the same having been used before; but

What I claim and desire to secure by Letters Patent is—

The wedge shaped block G with any convenient number of wings in combination with the perforated hollow cone C and its similarly shaped piece of gum elastic or other similar substance E, arranged and constructed substantially as herein specified, the same to be applied as buckets or valves for pumps.

JOSEPH WEIS.

Witnesses:
  HENRY HOWSON,
  THOMAS BENNETT.